May 25, 1965

L. AXTHAMMER 3,185,262

SHOCK ABSORBER STRUCTURE AND THE LIKE

Filed Nov. 2, 1962

United States Patent Office 3,185,262
Patented May 25, 1965

3,185,262
SHOCK ABSORBER STRUCTURE AND THE LIKE
Ludwig Axthammer, Schweinfurt (Main), Germany, assignor to Fichtel & Sachs Aktiengesellschaft, Schweinfurt (Main), Germany
Filed Nov. 2, 1962, Ser. No. 234,921
Claims priority, application Germany, Nov. 29, 1961, F 35,426
4 Claims. (Cl. 188—100)

This invention relates to shock absorber structures and the like and more particularly to shock absorbers of the hydraulic-pneumatic type.

It is an object of the invention to provide an improved shock absorber of the hydraulic-pneumatic type and particularly an improved packing structure for the same for purposes of sealing a pressure medium therein.

Generally stated, there is proposed in accordance with the invention, the provision of apparatus comprising first means defining a chamber having an opening therein which is adapted for accommodating a pressure medium, with second means being provided which extends through the aforesaid opening into the chamber and which is adapted to vary the pressure of the medium therein, there being further provided third means in the opening between the first and second means to form a pressure tight seal therebetween, with a force dependent upon the pressure of the medium in the aforesaid chamber.

According to a feature of the invention, the third means indicated above includes a first element adapted for engaging the second means with a force which is variable, and a second element engaging the first element and responsive to the pressure of said medium for urging said first element against the second means with a force related to the above noted pressure.

According to a further feature of the invention, the third means further includes a closure member in the opening and supporting the first and second elements.

The second means may consist of a piston and a piston rod connected thereto, the first element noted above being a packing ring encircling the piston rod and the second element being a rigid ring encircling the rod and being located between the packing ring and the above noted chamber.

According to a characteristic feature of the invention, the above noted rings and piston rod define a substantially common axis and the packing ring includes a portion in contact with this rod for purposes of forming the above noted seal and angularly related to the aforesaid axis.

According to one embodiment of the invention, the above noted portion of the packing ring defines a substantially conical recess centered on the above axis and narrowing in the direction of the chamber. According to a further embodiment, this recess may be of spherical shape. According to still another aspect of the invention, the aforesaid rings may have planar surfaces perpendicular to the above noted axis and in abutting face-to-face relationship over the entire respective areas thereof.

Still further, the packing ring may be provided with an outer cylindrical periphery or an outer conical periphery, according to two respective embodiments of the invention. Still further, the packing ring may be provided with an outer spherical periphery.

In one known type of shock absorber structure of the prior art, a gasket is employed to provide a seal which presses against the associated piston rod over the entire axial extent of the gasket. This causes an unfavorable action on the equalizing characteristics of the shock absorber in view of the fact that a maximum friction results between the gasket and the piston rod.

It is an object of the invention to provide an improved structure in which the friction between the piston rod and the related sealing mechanism is decreased to a minimum.

In addition, with respect to the prior art, packings have previously been employed, the bearing pressure of which is very high in order to be able to resist the extreme pressures which arise during operation. This means, since the bearing pressure is always of the same magnitude, that extremely high bearing pressures are constantly employed which reflect in decreased life span of the apparatus.

It is an object of the invention to provide an improved structure wherein the bearing pressure is related to the internal pressure of the device, such that when a relatively low internal pressure is employed, the bearing pressure can be relaxed and the longevity of the apparatus increased.

Accordingly, it is a characteristic feature of the invention to improve the life span of a packing employed for providing a seal in hydraulic-pneumatic shock absorbers and the like, the bearing pressure of the packing body against the associated piston rod depending at any given instant on the pressure differential (between internal pressure and atmospheric pressure) which exists in the shock absorber, there being further provided the improvement whereby wear of the packing may be compensated by elastic deformation of the packing body.

According to a further feature of the invention, the means provided for varying the pressure with which the packing engages the associated piston rod, may be further employed for concomitantly serving as a guide for the piston rod.

The invention contemplates varying either the pressure with which the rod is engaged by the packing, or the area of contact therebetween, or both of these parameters.

Other objects and features of the invention will be apparent from the following detailed description of some preferred embodiments, as illustrated in the accompanying drawing in which.

Figure 1:
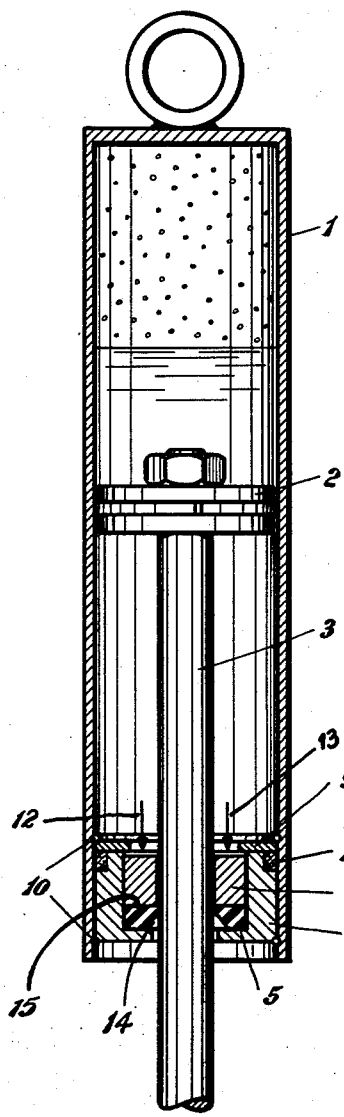
FIGURE 1 is a longitudinal sectional view of a shock absorber provided in accordance with one embodiment of the invention.
Figure 2:
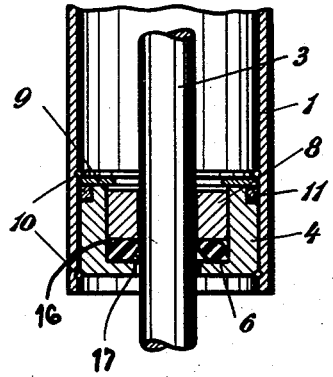
FIGURE 2 illustrates a variation of the structure of FIG. 1, according to a second embodiment of the invention.
Figure 3:
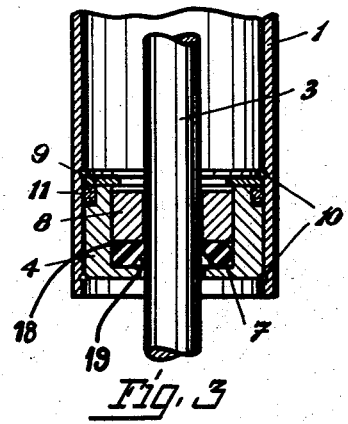
FIGURE 3 is a view similar to that of FIG. 2, illustrating a still further embodiment of the invention.

The embodiments of the invention illustrated in FIGS. 1-3 comprise a cylinder 1, an equalizing piston 2, and a piston rod 3 connected to the piston 2.

The cylinder 1 has an open end which is obturated by means of a cylindrical closure device 4 having an inwardly opening bore or recess, wherein is accommodated an annular packing body 5 (FIG. 1), 6 (FIG. 2), or 7 (FIG. 3).

Above the associated packing body is provided an axially movable annular body or ring 8, the piston rod 3 passing through both the packing body and the ring 8.

The rings accommodated within the bore of the closure device 4 are retained in position by means of a disc 9, which together with the closure device 4 is secured to the interior wall of the cylinder 1 by means of two locking rings 10.

A packing 11 is employed between the exterior surface of the closure device 4 and the interior surface of the cylinder 1 to provide a pressure tight seal therebetween.

According to the invention the packing body of each embodiment is pressed against the piston rod 3 associated therewith by means of the associated ring or rigid member 8 and this pressing operation is solely and exclusively related to the pressure which exists inside the cylinder 1 below the piston 2. This pressure is indicated in the form of arrows 12 and 13 in FIG. 1.

Inasmuch as ring 8 is axially displaceable in the bore of closure device 4, it will exert an axial pressure upon the packing ring 5 which is preferably of an elastic material such as rubber, nylon or the like.

Since the packing body is surrounded at the outer periphery thereof by a rigid bracing mechanism constituted by the closure device 4, the axial pressure of annular body 8 will effect an elastic deformation of the packing body in a radial sense and will thereby press the latter against the piston rod 3 which extends therethrough.

By varying the outer diameter of the ring 8 and by thus changing the surface area along which pressure is exerted, the compression between the packing and piston rod may be caused to vary and to be held thereby within suitable limits.

Wear of the packing produced in the course of operation is compensated by additional elastic deformation of the packing body.

In the embodiment of FIG. 1, the packing defines an interior space 14 of conical shape and rings 5 and 8 are in abutting face-to-face relationship along planar surfaces (indicated generally at 15) perpendicular to the axis defined by piston rod 3 and rings 5 and 8.

In the embodiment of FIG. 2, ring 6 is provided with an arcuate or spherical outer periphery 16 and with a conical inner periphery 17, the upper surface of ring 6 contacting the lower surface of ring 8 along less than the entire area of the latter.

The embodiment of FIG. 3 illustrates that it is possible to provide both the outer periphery 18 and the inner periphery 19 with arcuate or spherical configurations.

In general it is to be noted that each of the embodiments of the invention provides for packing rings which include portions angularly related to the axis of the piston rod 3. This assures that an axial force exerted by the related ring 8 will cause a radial displacement of a portion of the packing ring towards the associated piston rod for engagement therewith with a greater or lesser force, according to the pressure existing within the cylinder 1.

The variation or controlled engagement between the packing ring and piston rod may be considered as being one of contacting area as well as one of force in accordance with the invention, certain embodiments of the invention providing for a greater area of contact between the packing ring and the piston rod at greater pressures within the cylinder 1.

There will now be obvious to those skilled in the art many modifications and variations of the structure set forth above. These modifications and variations will not depart from the scope of the invention as defined by the following claims.

What is claimed is:

1. Apparatus comprising a cylinder having opposite ends, one of which is closed, a piston slidably supported in said cylinder to vary the pressure of a pressure medium in the cylinder, a piston rod connected to the piston and extending axially in the cylinder, and means supported at the other of the ends of the cylinder and engaging the piston rod to form a pressure-tight seal between the piston rod and the cylinder with a force dependent upon the pressure of the medium in said cylinder, said means comprising a rigid closure mechanism supported in said cylinder, said closure mechanism having a central bore, an annular packing ring supported in the bore of the closure mechanism and having a central opening for the passage of the piston rod, said packing ring having an upper and a lower surface, an annular body encircling the piston rod and resting on the upper surface of the packing ring while being guidably supported in the bore of the closure mechanism, said annular body having a face exposed within the cylinder for receiving the application of force by the pressure medium, said packing ring being radially and axially retained in position by the annular body and the closure mechanism, said opening in said packing ring having a cylindrical upper portion extending downwardly from the upper surface of the ring and a smooth continuous lower portion which extends from the cylindrical portion to the lower surface and which widens continually to said lower surface to define a substantial interior space with the piston rod, said packing ring having an outer smooth surface which includes a cylindrical portion accommodated in said bore and an upwardly extending portion on said cylindrical portion which narrows upwardly to said upper surface which is in contact with the annular body to define a substantial space between the upwardly extending portion of the ring and the annular body and closure member.

2. Apparatus as claimed in claim 1, wherein said upwardly extending portion of the outer surface of the packing ring is frusto-conical in shape.

3. Apparatus as claimed in claim 1, wherein said upwardly extending portion of the outer surface of the packing ring is arcuate.

4. Apparatus as claimed in claim 1, wherein said lower portion of the opening in the packing ring is arcuate.

References Cited by the Examiner

UNITED STATES PATENTS

| | | | |
|---|---|---|---|
| 2,667,348 | 1/54 | Frye et al. | 267—64 |
| 2,957,712 | 10/60 | Farmer | 188—100 |
| 2,992,817 | 7/61 | Templeton | 267—64 |
| 2,992,864 | 7/61 | De Carbon | 188—100 |
| 3,004,783 | 10/61 | Webb | 188—100 |

OTHER REFERENCES

De Carbon (German printed application), No. 1,086,501, August 4, 1960.

ARTHUR L. LA POINT, *Primary Examiner.*